(12) United States Patent
Kobyakov et al.

(10) Patent No.: US 9,159,081 B2
(45) Date of Patent: Oct. 13, 2015

(54) CONTENT ITEM TYPE DETERMINATION AND SELECTION

(71) Applicant: Google Inc., Mountain View, CA (US)

(72) Inventors: Pavel Kobyakov, Waterloo (CA); Ksenia Shubina, Vaughan (CA)

(73) Assignee: Google Inc., Mountain View, CA (US)

( * ) Notice: Subject to any disclaimer, the term of this patent is extended or adjusted under 35 U.S.C. 154(b) by 330 days.

(21) Appl. No.: 13/657,916

(22) Filed: Oct. 23, 2012

(65) Prior Publication Data

US 2014/0115095 A1  Apr. 24, 2014

(51) Int. Cl.
G06F 15/16 (2006.01)
G06Q 30/02 (2012.01)

(52) U.S. Cl.
CPC .................................. *G06Q 30/0241* (2013.01)

(58) Field of Classification Search
USPC ................................................ 709/217, 220
See application file for complete search history.

(56) References Cited

U.S. PATENT DOCUMENTS

| | | | |
|---|---|---|---|
| 6,973,436 B1 | 12/2005 | Shkedi | |
| 8,255,495 B1 | 8/2012 | Lee | |
| 2007/0299857 A1 | 12/2007 | Gwozdz | |
| 2008/0221909 A1* | 9/2008 | Muhonen et al. | 705/1 |
| 2009/0070413 A1 | 3/2009 | Priyadarshan et al. | |
| 2009/0083274 A1 | 3/2009 | Roden | |
| 2009/0299862 A1 | 12/2009 | Fan | |
| 2010/0185513 A1* | 7/2010 | Anderson et al. | 705/14.49 |
| 2010/0313129 A1 | 12/2010 | Hyman | |
| 2011/0029393 A1* | 2/2011 | Apprendi et al. | 705/14.73 |
| 2011/0055685 A1 | 3/2011 | Jaquish | |
| 2011/0153435 A1 | 6/2011 | Pisaris-Henderson | |
| 2011/0161990 A1 | 6/2011 | Smith et al. | |
| 2012/0016749 A1 | 1/2012 | Lisbakken | |
| 2012/0101907 A1 | 4/2012 | Dodda | |
| 2012/0229473 A1 | 9/2012 | Tam | |

FOREIGN PATENT DOCUMENTS

WO    WO0019332 A9    10/2001

OTHER PUBLICATIONS

Gilbert, David, "Set IFRAME height based on size of remotely loaded content", solidgone Blog, Mar. 13, 2010, XP055066250, Retrieved from the Internet: URL:http://solidgone.org/Set-IFRAME-height-based-on-size-of-remotely-loaded-content [retrieved on Jun. 11, 2013], abstract, 10 pages.

"Peters, 'Iframe loading techniques and performance', aaronpeters.nl, Dec. 20, 2010, on line at aaronpeters.nl/blog/iframeloading-techniques-performance?%3E", 11 pages.

How do iframe busters for expandable ads work?; javascript—How do iframe busters for expandable ads work?—Stack Overflow; http://stackoverflow.com/questions/5553469/how-do-iframe-busters-for-expandable-ads-work; Aug. 15, 2012; 3 pages.

(Continued)

*Primary Examiner* — Joseph E Avellino
*Assistant Examiner* — Marshall McLeod
(74) *Attorney, Agent, or Firm* — Fish & Richardson P.C.

(57) ABSTRACT

This specification describes methods, systems, and apparatus, including computer programs encoded on a computer-readable storage device, for determining content item environment types for content items rendered in a web based resource.

21 Claims, 5 Drawing Sheets

(56) References Cited

OTHER PUBLICATIONS

Introducing expandable ads on AdSense sites—Inside AdSense; Inside AdSense Blog; http://adsense.blogspot.com/2009/03/introducing-expandable-ads-on-adsense.html; Aug. 14, 2012; Mar. 4, 2009; 8 pages.

Macro overview; dfp DoubleClick for Publishers; http://support.google.com/dfp_premium/bin/answer.py?hl=en&answer=1242718; Aug. 14, 2012; 7 pages.

Expanding Options in Expandable Ads; Jun. 4, 2009; Wegert, Tessa; ClickZ/Marketing News & Expert Advise; http://www.clickz.com/clickz/column/1699404/expanding-options-expandable-ads; Aug. 15, 2012; 3 pages.

International Search Report and Written Opinion in International Application No. PCT/US2013/066127, mailed Feb. 14, 2014, 11 pages.

\* cited by examiner

CONTENT ITEM TYPE DETERMINATION AND SELECTION

BACKGROUND

This specification relates to information presentation.

Resources that include content can be provided over the Internet to various user devices. Many of these resources include content item environments in which additional content can be displayed. Typically the content of the resource is provided by a publisher, while the content items displayed in the content item environments are provided by third parties. For example, a web page can include slots in which sponsored content items, such as advertisements, can be presented. These slots can be defined in the web page or defined for presentation with a web page, for example, along with search results or other content provided by the publisher.

There are different types of content item environments that can be used to display third-party content items in a resource provided by a publisher. Two such environments are script environments and in-line frame environments, or "iFrame" environments. In script environments, the content of the content item environment slot are also considered to be part of the content of the resource, and thus the content is determined to belong to the domain of publisher that served the resource. In iFrame environments, however, the content of the content item environment slot, if it is determined to belong to the domain of another entity, such as an advertisement server, are not considered to be part of the content of the resource.

The type of content item environment used by a publisher may be of interest to advertisers and/or advertisement management systems that serve such advertisements on behalf of the advertisers. In particular, same-domain environments can programmatically communicate, but such communications are not readily facilitated between cross-domain content item environments. Some serving features for particular advertisements may require access to the content of the resource, and thus serving these particular advertisements in iFrame environments may lead to sup-optimal performance. Likewise, advertisers serving expandable advertisements may desire to run such advertisements only in script environments to minimize non-expansion impression rates.

SUMMARY

In general, one aspect of the subject matter described in this specification can be embodied in methods that include the actions of: for each of a plurality of content item requests for a content item, each content item request received from a user device and specifying a resource address and content item environment identifier of a content item environment in a resource that is addressed by the resource address: receiving content item data specifying a content item selected to fulfill the content item request, the data including an impression identifier that uniquely identifies an impression for which the content item was selected, appending to the content item data a reporting instructions that causes a user device to determine a content item environment type of the content item environment and generate a reporting message specifying the content item environment type, wherein the content item environment type determined is one of at least two different content item environment types; and sending the content item data specifying a content item and the reporting instruction to the user device that generated the content item request Other embodiments of this aspect include corresponding systems, apparatus, and computer program products.

Particular embodiments of the subject matter described in this specification can be implemented so as to realize one or more of the following advantages. The process allows for determining content item environment types for content item environment and resource combinations so that a content item environment of a particular type is less likely to be paired with a content item that is not to be served for content item environments of the particular type. This leads to a reduction in processing errors and reporting errors resulting from improper pairings of content items with content item environments of the particular type. By adding the reporting instructions to only a subset of all content items served, the process ensures that sufficient data are gathered to build models without unnecessarily increasing traffic between client devices and the content item server.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1:
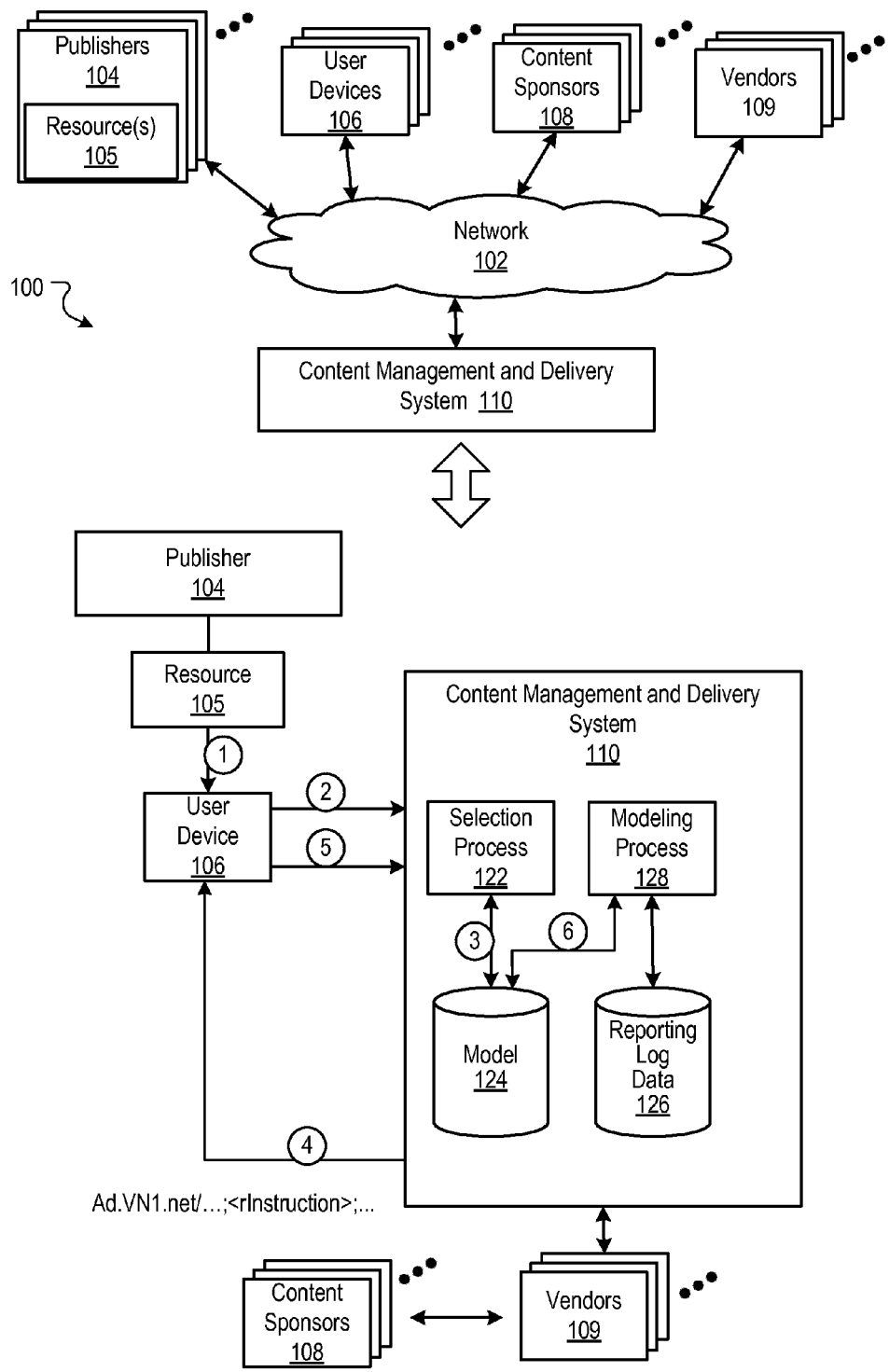
FIG. 1 is a block diagram of an example environment for delivering content.

The subject matter of this application provides detection of content item environment types for content item environments in resources, the modeling of the same, and the selection of content items for content item environments based on the modeling. One example implementation is described in the context of an advertising exchange. In the case of advertisements served over an exchange, a content sponsor is typically an advertiser that uses one or more vendors, each of which places advertisements for advertisers through an exchange.

A content item management system, such as an advertising exchange in the case of advertisements, adds reporting instructions to advertisement content items that are served for a subset of advertisement content item requests. Each request includes, for each content item environment, a content item environment identifier that identifies the content item environment, and an address of the resource. The content item identifier may be a slot identifier in a particular resource. For example, three different content item slots in a particular resource may be identified by three separate numeric identifiers that are each unique with respect to the particular resource. The address data may be the resource URL, which includes the domain and host name of a computer device hosting the resource, a path, and the name of the resource. The reporting instructions are used to determine, at the user device, the content item environment type of the content item environment, and to generate a reporting message that reports the determined environment type. Two such example types are script types and iFrame types.

Reporting messages are received from the user devices that execute the reporting instructions they receive. The messages are aggregated, and a model for each resource address and content item environment identifier is created. Thereafter, when a content item request for a modeled resource address and content item identifier pair is received, the model receives the resource address and content item identifier as input and provides a predicted content item environment type as output.

For each content item environment, if the model returns a successful prediction for the content item environment type, the content item management system uses the returned type to filter content items that are eligible for selection for the particular content item environment. For example, if there two are different content item environment types, and the first type is returned from the model for a particular request, then the system precludes the selection of content items that are specified to be rendered in content item environments of only the second type (or to not be rendered in content item environments of the first type).

If, however, the model does not return a successful prediction (e.g., a null prediction value or, alternatively, returns a predicted content item environment type with a confidence measure that does not meet a threshold) for a particular content item environment and resource pair, then the content item management system precludes selection of any content item that are specified to be rendered in only a particular subset of the environment types (or to not be rendered in any particular type of content item environments).

These features and other features are described in more detail below.

Example Environment

FIG. 1 is a block diagram of an example environment 100 for delivering content. The example environment 100 includes a content management and delivery system 110 for selecting and providing content to user devices. The example environment 100 includes a network 102, such as wide area network (WAN), the Internet, or a combination thereof. The network 102 connects publisher 104, user devices 106, content sponsors 108 (e.g., advertisers that use vendors to serve advertisements), vendors 109, and the content management and delivery system 110. The example environment 100 may include many thousands of publishers 104, user devices 106, content sponsors 108.

A publisher 104 typically manages a website that includes one or more resources 105 associated with a domain name and hosted by one or more servers. An example website is a collection of web pages formatted in hypertext markup language (HTML) that can contain text, images, multimedia content, and programming elements, such as scripts. Each publisher 104 is an entity that controls, manages and/or owns the website.

A resource 105 can be any data that can be provided over the network 102. A resource 105 can be identified by a resource address that is associated with the resource 105. Resources include HTML pages, images, video, and news feed sources, to name only a few. The resources can include content, such as words, phrases, images, video and sounds, that may include embedded information (such as meta-information hyperlinks) and/or embedded instructions (such as scripts). In some implementations, the resources 105 can include sponsored content provided by the content sponsors 108 and that can be rendered in specific locations in the resource. For example, the resources 105 can include an advertisement, a deal or a special offer sponsored by a content sponsor 108.

A user device 106 is an electronic device that is under control of a user and is capable of requesting and receiving resources over the network 102. Example user devices 106 include personal computers, televisions with one or more processors embedded therein or coupled thereto, set top boxes, mobile communication devices (e.g., smartphones), tablet computers, e-readers, laptop computers, personal digital assistants (PDA), and other devices that can send and receive data over the network 102. A user device 106 typically includes one or more user applications, such as a web browser, to facilitate the sending and receiving of data over the network 102.

A user device 106 can request resources 105 from a publisher 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content can be presented. These specified portions of the resource or user display are referred to as slots (e.g., content item slots, or, in the case of advertisement content items, advertisement slots).

When a resource 105 is requested by a user device 106 and the resource includes a content item slot in which a content item of a sponsor is to be rendered, the content management system 110 receives a request for a content item. The request for the content item can include the content item environment identifier and the address of the resource.

The content management and delivery system 110 can select from the eligible content items that are to be provided to the user device 106 based at least in part, for example, on results of an auction selection process 122. The content management and delivery system 110 must first determine which content items are eligible to participate in the auction. One eligibility factor is an environment type. In particular, content items should only be eligible for an auction if the content item environment of the web page resource is of a type for which the content item is specified to be rendered in, or is of the type for which the content item is not to be precluded from being rendered in. For example, some content item may be specified as only being allowed to be rendered in script environments, while other some content item may be specified as only being allowed to be rendered in iFrame environments. Finally, some content items may not be specified to have any environment type restrictions.

Selection of eligible content items from a set of content items is based in part on a model 124 that predicts a content item type from a resource address and content item identifier input. From these eligible content items, one or more content items are selected for rendering in the content item environments. The selected content items are then provided to the user device for rendering in the respective content item environment slots.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Model Generation

The content management and deliver system 110 determines content item environment types for resource address and content item identifier pairs by building a maintaining a model 124. To gather the data necessary to build and maintain the model 124, the system 110 includes, in a subset of content items provided in response to requests, reporting instructions that cause a user device to determine a content item environment type of the content item environment. The reporting instructions then cause the user device to provide a reporting message to the content management and deliver system 110, which stores the reporting messages in reporting log data 126.

Figure 2:
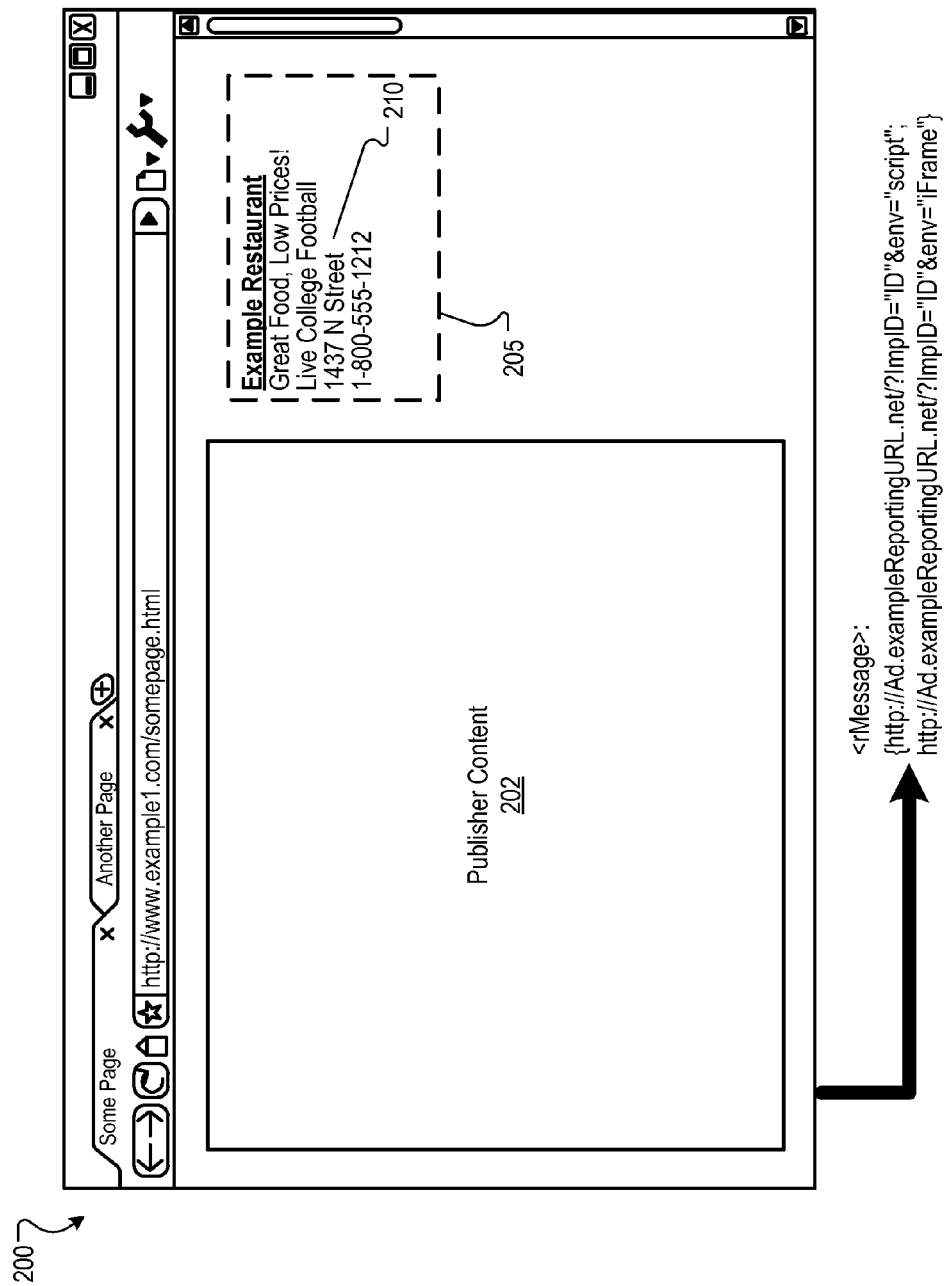
FIG. 2 depicts a browser window displaying a sponsored content item.

The generation of the reporting message is graphically depicted in FIG. 2, which depicts a browser window 200 displaying a sponsored content item. For example, the resource can include specific publisher content 202 that is authored by the publisher. Additionally, resource includes a content item slot 205 in which a content item from a third party can be rendered. The content management and delivery system 110 can provide the third-party content item (e.g., advertisements, etc.) from a pool of available content items.

The content item slot 205 is a content item environment of a particular type. The reporting instructions, executing at the client device, determine the content item environment type, and provide the reporting message <rMessage> to content management and delivery system 110.

Any appropriate reporting message format may be used, as long as the reporting message can result in the association of the resource address, the content item identifier, and the detected content item environment type. One example reporting message format is a URL request. For example, the reporting message that is generated may be a resource locator that specifies a reporting address, and includes query parameters that include an impression identifier that uniquely identifies the impression, and the environment type. The impression identifier and environment types may be included as query parameters. To illustrate, for two environment types of "script" and "iFrame," the respective URL requests are:

http://Ad.exampleReportingURL.net/?ImpID="ID"&env="script"; and http://Ad.exampleReportingURL.net/?ImpID="ID"&env="iFrame"

An impression identifier is used to reconcile reporting messages with advertisement requests logs stored at the content management and deliver system 110. From these reconciled logs the modeling process 128 generates a model that determines a content item environment type based on a resource address and content item identifier input pair.

Figure 3:
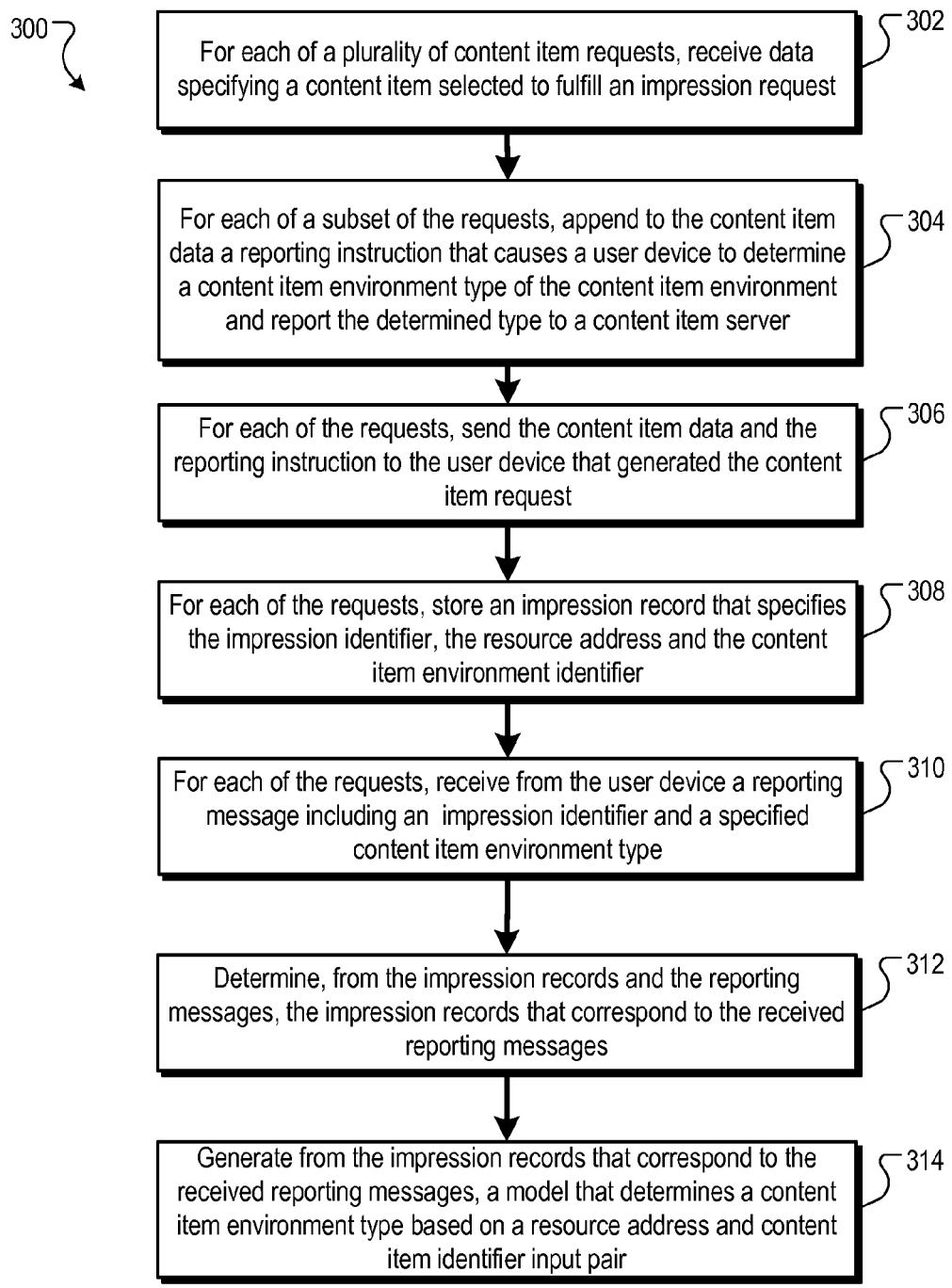
FIG. 3 is a flow diagram of an example process for modifying content item tags with a reporting instruction, and processing the resulting reporting messages received.

The modeling generation process 128 is described in particular with reference to FIG. 3, which is a flow diagram of an example process 300 for modifying content item tags with a reporting instruction, and processing the resulting reporting messages received. The process 300 can be implemented in a data processing apparatus of one or more computers. Reference is also made to FIG. 1, which depicts data flows for both the model generation and selection of content items using the generated model.

As shown in FIG. 1, a user device 106 requests a resource 104 from a publisher 104, as indicated by data flow element 1. The resource includes a content item environment in which a content item is to be displayed. The user device 106 requests a content item from the content management and delivery system 110, as indicated by data flow element 2. This process is repeated for multiple user devices and multiple publishers, resulting in multiple content item requests. Each request received from a user device specifies a resource address and content item environment identifier of a content item environment in a resource that is addressed by the resource address.

For each of a plurality of content item requests, the process 300 receives data specifying a content item selected to fulfill an impression request (302). The content item is selected by use of the selection process 122, as indicated by the data flow element 3. The selection process 122 references the model 124, using the resource address and the content item environment identifier as input. If the model has sufficient data, a successful prediction of the environment type is returned. If the model does not have sufficient data or the model is determined to be inaccurate for the resource address and environment identifier pair, an unsuccessful prediction is returned. A model may not have sufficient data for a resource and content item environment identifier pair if, for example, the resource is a newly published resource. An unsuccessful prediction may be, for example, an indeterminate prediction, a prediction that does not have a high confidence value in the event type likelihood, or a prediction for which the event type likelihood is below a threshold, such as 80%. As described above, the selection process uses the prediction result to filter content items for selection.

For a subset of the requests, e.g., 5% or less, the process 300 appends to the content item data a reporting instructions that causes a user device to determine a content item environment type of the content item environment and report the determined type to a content item server (304). For example, in the case in which the environments include iFrames and script environment, the instructions may be the following:

```
try {
    var h = window.top.location.href;
    report("script environment")
    // Can access top window -- js tag.
} catch (e) {
    report("iframe environment")
    // Cannot access top window -- iframe tag.
}
```

The try-catch script includes two blocks, the try block and the catch block. The try block contains the code to be run, and the catch block contains the code to be executed if an error occurs. The code in the try block "var h=window.top.location.href" performs an operation that accesses, from the content item environment, resource data belonging to the domain of the publisher of the resource.

If the environment is an iFrame environment, then the domain of the iFrame belongs to the content item server 110, which is different from the domain of the publisher. As used in this specification, a content item environment "belongs" to a particular domain when it has administrative authority for that domain. For example, in the browser environment, the web page 200 belongs to the domain on the publisher, while the content item environments 205, if an iFrame, belongs to the domain of the content server.

Same-domain content item environments can programmatically communicate, but such communications are not readily facilitated between cross-domain content item environments. This realizes a cross-site scripting security measure that makes it more difficult for a publisher or an intervening third party to implement abusive processes (e.g., spamming, false impression reporting) within the content item environments.

Thus, if the environment is an iFrame environment type, the operation "var h=window.top.location.href" will result in an exception. Should the exception occur, the try block exits and the catch block executes, indicating a determination that the environment is an iFrame environment. The catch block includes an instruction "report("iframe environment")" that reports to the content management and delivery system 110 that the environment is an iFrame environment. As described above, the instruction can be an HTTP request to a reporting URL, or, alternatively, can be any appropriate reporting instruction.

Conversely, if the content item environment is a script environment, then the environment belongs to the domain of the publisher, and the operation "var h=window.top.location.href" will not result in an exception. The try block then executes the instruction "report("script environment")," indicating a determination that the environment is a script environment type. The catch block does not execute because no exception occurs.

For each of the requests, the process 300 sends the content item data and the reporting instruction to specifying a content item to the user device that generated the content item request (306). For example, in FIG. 1, the data flow element 4 represents the subset of the content item with the reporting instruction. Furthermore, for each of the requests, the process 300 stores an impression record that specifies the impression identifier, the resource address and the content item environment identifier (308). The impression record is stored in the reporting log data 126, for example.

For each of the subset of requests, the process 300 receives from the user device a reporting message including an impression identifier and a specified content item environment type (310). For example, the process 300 receives various reporting URL requests, one from each user device that renders a content item with the added reporting instructions, as indicated by the data flow element 5. Each of the URL requests includes of query parameter specifying the impression identifier, and the environment type.

The process 300 determines, from the impression records and the reporting messages, the impression records that correspond to the received reporting messages (312). Accordingly, the impression identifier is used to associate a resource address and content item identifier pair with a determined environment type.

The process 300 generates, from the impression records that correspond to the received reporting messages, a model that determines a content item environment type based on a resource address and content item identifier input pair (314). As shown in FIG. 1, the modeling process 124 generates and updates the model 124, as indicated by data flow element 6. The model can, for example, be based on environment type results for each resource address and URL pair.

In some implementations, the reporting instruction is configured to include the content item environment type, the resource address and the content item environment identifier. In these implementations, the process 300 need not access the impression records, as all the information needed to create the models is included in the reporting records.

In some implementations, the model 124 is created by aggregating messages for each resource address and content item environment identifier pair. The percentage of environment types is then determined from the aggregated messages. For example, for a particular resource address and content item identifier pair, the content environment types received may indicate that 95% of all requests have been for an iFrame environment, and 5% for a script environment. Accordingly, the model will return a prediction that the environment is 95% likely to be an iFrame environment.

In some implementations, the model 124 is time weighted to discount earlier messages. This results in changes to an environment type in a resource being reflected in the model more quickly than if all reporting messages are equally weighted for a time period. A variety of appropriate weighting schemes can be used.

Content Item Selection Based on Environment Type

Figure 4:
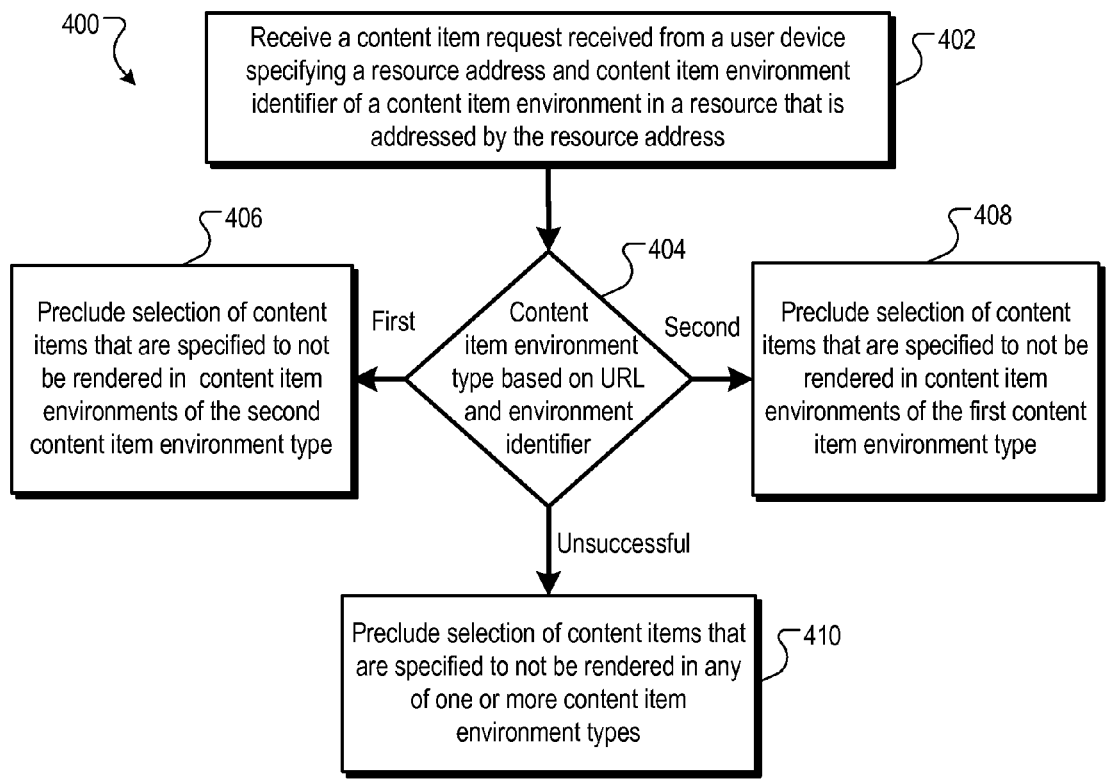
FIG. 4 is a flow diagram of an example process for determining a content item environment type for a content item request and filtering content items in response to the determination.

After the model 124 is built, the system utilizes the model to select content items responsive to content item requests. One such example process is described with respect to FIG. 4, which is a flow diagram of an example process 400 for determining a content item environment type for a content item request and filtering content items in response to the determination.

The process 400 receives a content item request received from a user device specifying a resource address and content item environment identifier of a content item environment in a resource that is addressed by the resource address (402).

The process 400 determines a content item environment type based on URL and environment identifier (404). For example, the selection process 122 references the model 124, using the resource address and the content item environment identifier as input. The model will return a predicted content item environment type successfully, or may return an unsuccessful prediction. To illustrate, assume there are two content item environment types for which the model makes predictions—a first type (e.g., a script type) and a second type (e.g., an iFrame type).

If the environment type is a first type, then the process 400 precludes selection of content items that are specified to not be rendered in content item environments of the second content item environment type (406). For example, if the environment type is a script type, then content items that are specified to be rendered in iFrame environments only, or to not be rendered in script environments, are precluded from being selected to respond to the request.

If the environment type is a second type, then the process 400 precluded selection of content items that are specified to not be rendered in content item environments of the first content item environment type (408). For example, if the environment type is an iFrame type, then content items that are specified to be rendered in script environments only, or to not be rendered in iFrame environments, are precluded from being selected to respond to the request.

If the environment type is unsuccessful, then the process 400 precludes selection of content items that are specified to not be rendered in any of one or more content item environment types (410). For example, only content items that do not have a specified environment type in which to be rendered (or to not be rendered) are selected from to respond to the request. Content items that do have a specified environment type in which to be rendered (or to not be rendered) are precluded from selection.

For a subset of the content items that are eventually selected after execution of the process, the system 110 may include the reporting instructions with the content item, as described in the process 300. By doing so, the system 110 continually maintains the model for previously modeled resource identifier and environment identifier pairs.

Additional Reporting and Processing Features

In the examples described above, two different types of content item environments are used to describe the features of the determination and selection processes. However, the system can be configured to detect additional environment types and/or tag types. The reporting instructions described above can include additional instructions that access DOM elements that include the request code used by the client device to generate the request, and determine from the request code particular tag types, the particular content item calls to be made at that content item delivery system 110 (e.g., image only, text only, only images served through streaming protocols), all of which may be reported and modeled.

Additional Implementation Details

Figure 5:
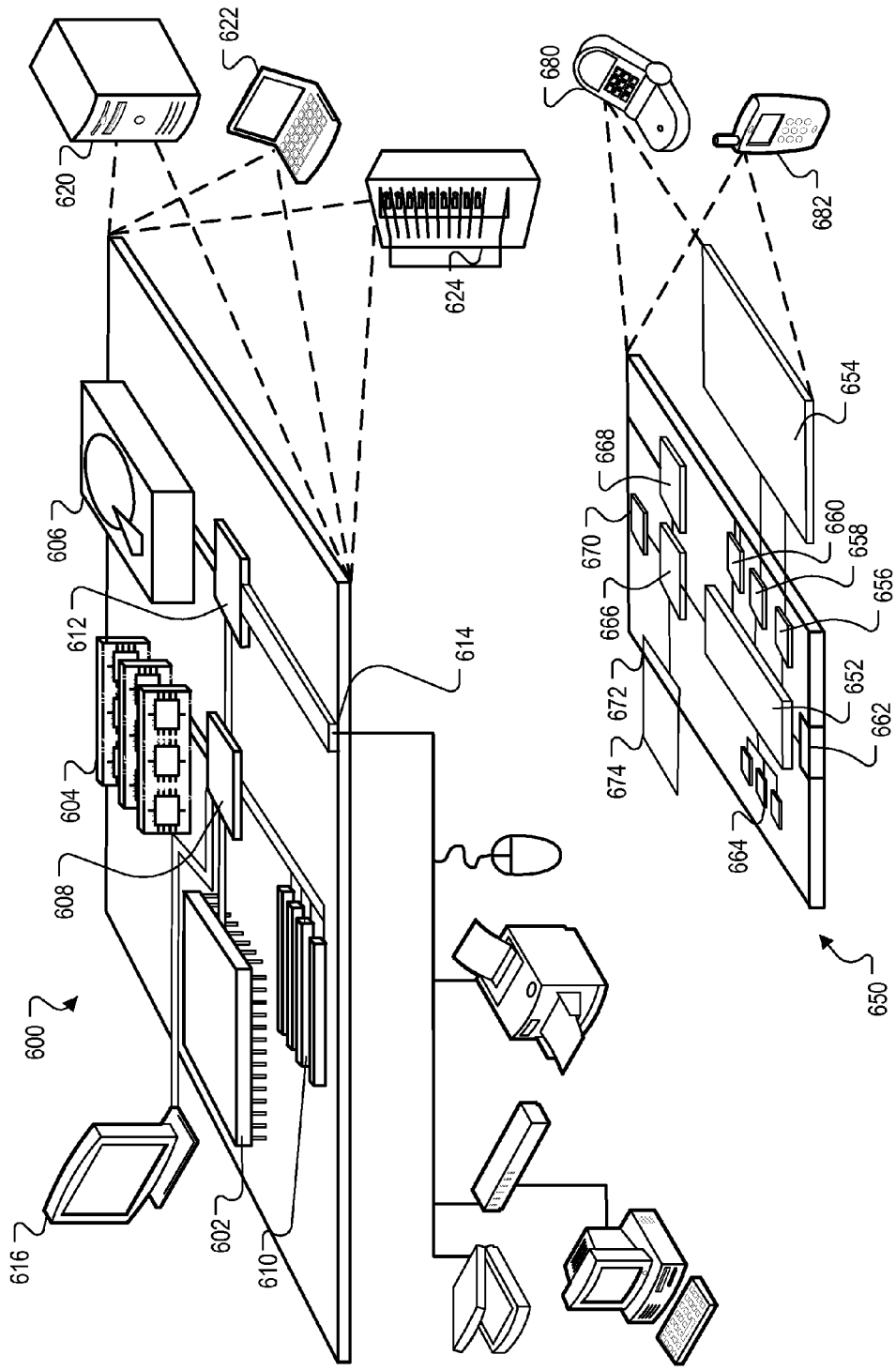
FIG. 5 is a block diagram of an example computer system that can be used to implement the methods, systems and processes described in this disclosure.

FIG. 5 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 600 is further intended to represent various typically non-mobile devices, such as televisions or other electronic devices with one or more processers embedded therein or attached thereto. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication (e.g., via a docking procedure) or for wireless communication (e.g., via a Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. A machine-readable medium or a computer-readable medium does not include a transitory signal.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method implemented in a content item serving system including one or more computers, comprising:
   receiving, by one or more computers and from a user device, a content item request specifying a resource address and content item slot identifier of a content item slot in a resource that is addressed by the resource address:
      receiving, by one or more computers, content item data specifying a content item selected to fulfill the content item request, the data including an impression identifier that uniquely identifies an impression for which the content item was selected;
      appending, by one or more computers and to the content item data, reporting instructions that cause a user device to determine a content item environment type of the content item slot and generate a reporting message specifying the content item environment type, wherein the content item environment type determined is one of at least two different content item environment types including script types and iFrame types, wherein the script type content item slots are rendered in the resource and belong to the domain of a publisher of the resource, and the iFrame type content item slots are rendered in an iFrame in the resource and belong to a domain that is different from the domain of the publisher; and
      sending by one or more computers, the content item data specifying a content item and the reporting instruction to the user device that generated the content item request.

2. The method of claim 1, wherein the content item is an advertisement.

3. The method of claim 2, further comprising:
   for each content item request, storing an impression record that specifies the impression identifier and the content item slot identifier;
   receiving from user devices and at the data processing apparatus reporting messages, each reporting message including an impression identifier and a specified content item environment type;
   determining, from the impression records and the reporting messages, the impression records that correspond to the received reporting messages; and
   generating, from the impression records that correspond to the received reporting messages, a model that determines a content item environment type based on a resource address and content item slot identifier input pair.

4. The method of claim 3, further comprising:
   for each of an additional plurality of received content item requests for a content item, each content item request received from a user device and specifying a resource address and content item slot identifier of a content item slot in a resource that is addressed by the resource address, determining from the model, based on the resource address and content item slot identifier of the content item request, a predicted content item environment type of the content item slot identified by the content item slot identifier;
   for each content item request for which the predicted content item environment type is of the script type, precluding selection of content items that are specified to not be rendered in content item slots of the script type; and
   for each content item request for which the predicted content item environment type is of iFrame type, precluding selection of content items that are specified to not be rendered in the content item slots of the iFrame type.

5. The method of claim 4, further comprising:
   for each content item request for which the predicted content item environment type is indeterminate, precluding selection of content items that are specified to not be rendered in any of one or more content item environment types.

6. The method of claim 4, wherein:
   the content item environments of the iFrame type belongs to the domain of the content item serving system.

7. The method of claim 6, wherein the reporting instructions that causes a user device to determine a content item environment type of the content item slot comprise instructions that cause the user device to perform operations comprising:
   performing an access operation that accesses, from the content item slot, resource data belonging to the domain of the publisher of the resource;
   determining whether an error resulting from the access operation occurs;
   when an error resulting from the access operation occurs, determining that the content item environment type is an iFrame type; and
   when an error resulting from the operation does not occur, determining that the content item environment type is a script type.

8. The method of claim 2, further comprising:
   receiving from user devices and at the data processing apparatus reporting messages, each reporting message including a resource address, a content item slot identifier, and a specified content item environment type; and
   generating, from the reporting messages, a model that determines a content item environment type based on a resource address and content item identifier input pair.

9. The method of claim 8, further comprising:
   for each of an additional plurality of received content item requests for a content item, each content item request received from a user device and specifying a resource address and content item slot identifier of a content item slot in a resource that is addressed by the resource address, determining from the model, based on the resource address and content item slot identifier of the content item request, a predicted content item environment type of the content item slot identified by the content item slot identifier;

for each content item request for which the predicted content item environment type is of a first content item environment type, precluding selection of content items that are specified to not be rendered in content item environments of the first content item environment type; and for each content item request for which the predicted content item environment type is of a second content item environment type, precluding selection of content items that are specified to not be rendered in the content item environments of the second content item environment type.

10. The method of claim 9, wherein the reporting instructions that causes a user device to determine a content item environment type of the content item slot comprise instructions that cause the user device to perform operations comprising:

performing an access operation that accesses, from the content item slot, resource data belonging to the domain of the publisher of the resource;

determining whether an error resulting from the access operation occurs;

when an error resulting from the access operation occurs, determining that the content item environment type is an iFrame type; and when an error resulting from the operation does not occur, determining that the content item environment type is a script type.

11. A system, comprising:

a data processing apparatus; and a computer memory apparatus in data communication with the data processing apparatus and storing instructions executable by the data processing apparatus and that upon such execution cause the data processing apparatus to perform operations comprising:

receiving, from a user device, a content item request specifying a resource address and content item slot identifier of a content item slot in a resource that is addressed by the resource address:

receiving content item data specifying a content item selected to fulfill the content item request, the data including an impression identifier that uniquely identifies an impression for which the content item was selected;

appending reporting instructions that cause a user device to determine a content item environment type of the content item slot and generate a reporting message specifying the content item environment type, wherein the content item environment type determined is one of at least two different content item environment types including script types and iFrame types, wherein the script type content item slots are rendered in the resource and belong to the domain of a publisher of the resource, and the iFrame type content item slots are rendered in an iFrame in the resource and belong to a domain that is different from the domain of the publisher; and sending the content item data specifying a content item and the reporting instruction to the user device that generated the content item request.

12. The system of claim 11, wherein the content item is an advertisement.

13. The system of claim 12, the operations further comprising:

for each content item request, storing an impression record that specifies the impression identifier and the content item slot identifier;

receiving from user devices and at the data processing apparatus reporting messages, each reporting message including an impression identifier and a specified content item environment type;

determining, from the impression records and the reporting messages, the impression records that correspond to the received reporting messages; and generating, from the impression records that correspond to the received reporting messages, a model that determines a content item environment type based on a resource address and content item slot identifier input pair.

14. The system of claim 13, the operations further comprising:

for each of an additional plurality of received content item requests for a content item, each content item request received from a user device and specifying a resource address and content item slot identifier of a content item slot in a resource that is addressed by the resource address, determining from the model, based on the resource address and content item slot identifier of the content item request, a predicted content item environment type of the content item slot identified by the content item slot identifier;

for each content item request for which the predicted content item environment type is of the script type, precluding selection of content items that are specified to not be rendered in content item slots of the script type; and for each content item request for which the predicted content item environment type is of iFrame type, precluding selection of content items that are specified to not be rendered in the content item slots of the iFrame type.

15. The system of claim 14, the operations further comprising:

for each content item request for which the predicted content item environment type is indeterminate, precluding selection of content items that are specified to not be rendered in any of one or more content item environment types.

16. The system of claim 14, wherein:

the content item environments of the iFrame type belongs to the domain of the content item serving system.

17. The system of claim 16, wherein the reporting instructions that causes a user device to determine a content item environment type of the content item slot comprise instructions that cause the user device to perform operations comprising:

performing an access operation that accesses, from the content item slot, resource data belonging to the domain of the publisher of the resource;

determining whether an error resulting from the access operation occurs;

when an error resulting from the access operation occurs, determining that the content item environment type is an iFrame type; and when an error resulting from the operation does not occur, determining that the content item environment type is a script type.

18. The system of claim 12, the operations further comprising:

receiving from user devices and at the data processing apparatus reporting messages, each reporting message including a resource address, a content item slot identifier, and a specified content item environment type; and generating, from the reporting messages, a model that determines a content item environment type based on a resource address and content item identifier input pair.

19. The system of claim 18, the operations further comprising:
- for each of an additional plurality of received content item requests for a content item, each content item request received from a user device and specifying a resource address and content item slot identifier of a content item slot in a resource that is addressed by the resource address, determining from the model, based on the resource address and content item slot identifier of the content item request, a predicted content item environment type of the content item slot identified by the content item slot identifier;
- for each content item request for which the predicted content item environment type is of a first content item environment type, precluding selection of content items that are specified to not be rendered in content item environments of the first content item environment type; and
- for each content item request for which the predicted content item environment type is of a second content item environment type, precluding selection of content items that are specified to not be rendered in the content item environments of the second content item environment type.

20. The system of claim 19, wherein the reporting instructions that causes a user device to determine a content item environment type of the content item slot comprise instructions that cause the user device to perform operations comprising:
- performing an access operation that accesses, from the content item slot, resource data belonging to the domain of the publisher of the resource;
- determining whether an error resulting from the access operation occurs;
- when an error resulting from the access operation occurs, determining that the content item environment type is an iFrame type; and
- when an error resulting from the operation does not occur, determining that the content item environment type is a script type.

21. A, non-transitory, computer memory device storing instructions executable by a data processing apparatus and that upon such execution cause the data processing apparatus to perform operations comprising:
- receiving, from a user device, a content item request specifying a resource address and content item slot identifier of a content item slot in a resource that is addressed by the resource address:
  - receiving content item data specifying a content item selected to fulfill the content item request, the data including an impression identifier that uniquely identifies an impression for which the content item was selected;
  - appending reporting instructions that cause a user device to determine a content item environment type of the content item slot and generate a reporting message specifying the content item environment type, wherein the content item environment type determined is one of at least two different content item environment types including script types and iFrame types, wherein the script type content item slots are rendered in the resource and belong to the domain of a publisher of the resource, and the iFrame type content item slots are rendered in an iFrame in the resource and belong to a domain that is different from the domain of the publisher; and
  - sending the content item data specifying a content item and the reporting instruction to the user device that generated the content item request.

* * * * *